US008149263B2

(12) United States Patent
DelHoyo (10) Patent No.: US 8,149,263 B2
(45) Date of Patent: Apr. 3, 2012

(54) DISTRIBUTED SCHEDULING, CALL CONTROL, AND RESOURCE MANAGEMENT FOR DISPERSED DYNAMIC VIDEO COMMUNICATIONS NETWORKS

(75) Inventor: Sergio Jason DelHoyo, Leesburg, VA (US)

(73) Assignee: Freeport Technologies, Herndon, VA (US)

( * ) Notice: Subject to any disclaimer, the term of this patent is extended or adjusted under 35 U.S.C. 154(b) by 744 days.

(21) Appl. No.: 12/356,852

(22) Filed: Jan. 21, 2009

(65) Prior Publication Data

US 2010/0182395 A1      Jul. 22, 2010

(51) Int. Cl.
*H04N 7/14* (2006.01)
(52) U.S. Cl. ............... 348/14.09; 348/14.03; 348/14.07; 348/14.08; 348/14.1; 348/14.11; 348/14.12; 348/14.13
(58) Field of Classification Search .... 348/14.01–14.16; 379/202.01–207.03; 455/416; 709/204
See application file for complete search history.

(56) References Cited

U.S. PATENT DOCUMENTS

| 5,933,417 | A * | 8/1999 | Rottoo ........................... 370/260 |
| 7,075,919 | B1 | 7/2006 | Wendt et al. |
| 7,492,730 | B2 * | 2/2009 | Eshel et al. .................... 370/260 |
| 2003/0097460 | A1 | 5/2003 | Higashiyama et al. |
| 2003/0223562 | A1 * | 12/2003 | Cui et al. .................. 379/202.01 |
| 2004/0228354 | A1 | 11/2004 | Anschutz et al. |
| 2004/0230444 | A1 | 11/2004 | Holt et al. |
| 2004/0252698 | A1 | 12/2004 | Anschutz et al. |
| 2005/0015493 | A1 | 1/2005 | Anschutz et al. |
| 2005/0015494 | A1 | 1/2005 | Adamczyk et al. |
| 2005/0021716 | A1 | 1/2005 | Adamczyk et al. |
| 2005/0060368 | A1 | 3/2005 | Wang et al. |
| 2005/0248652 | A1 | 11/2005 | Firestone et al. |
| 2006/0026002 | A1 * | 2/2006 | Potekhin et al. .............. 704/275 |
| 2006/0039381 | A1 | 2/2006 | Anschutz et al. |

(Continued)

OTHER PUBLICATIONS

Karapetkov, "Scalable Infrastructure for Distributed Video," Aug. 2008, www.polycom.com/common/documents/whitepapers/wp_scalable_architecture_for_distributed_video.pdf.

(Continued)

*Primary Examiner* — Joseph J Nuguyen
(74) *Attorney, Agent, or Firm* — Locke Lord LLP (57) ABSTRACT

Method, system, and computer program product example embodiments of the invention are disclosed to manage multiple network zones interconnected over a wide area network for video conferencing. In one example embodiment of the invention, an interface of a zone controller is configured to receive a first user request to schedule local resources for a video conferencing session within a local network zone. The zone controller is configured to access local services in the zone to schedule the local resources for the video conferencing session. The interface of the zone controller is further configured to receive a second user request to schedule remote resources in a remote network zone for the video conferencing session. A local Network Zone Manager in the zone controller is configured to determine a remote Network Zone Manager responsible for the remote resources in the remote network zone in response to the second user request. The local Network Zone Manager is further configured to send the second request to the remote Network Zone Manager. The local Network Zone Manager is further configured to receive information on availability of the remote resources from the remote Network Zone Manager and pass the information to a local scheduling service in the zone controller, which is configured to then schedule the video conferencing session between the local and remote resources.

21 Claims, 8 Drawing Sheets

U.S. PATENT DOCUMENTS

| | | |
|---|---|---|
| 2007/0064901 A1 | 3/2007 | Baird et al. |
| 2007/0126862 A1* | 6/2007 | Even et al. .................. 348/14.08 |
| 2007/0171274 A1* | 7/2007 | Yim ........................... 348/14.08 |
| 2007/0189152 A1 | 8/2007 | Tamura et al. |
| 2007/0211141 A1 | 9/2007 | Christiansen |
| 2007/0285506 A1* | 12/2007 | Schneider .................. 348/14.08 |
| 2008/0195703 A1 | 8/2008 | Salesky et al. |
| 2009/0251529 A1* | 10/2009 | Tucker et al. .............. 348/14.09 |
| 2010/0149306 A1* | 6/2010 | Gopal et al. ............... 348/14.09 |

OTHER PUBLICATIONS

International Search Report for International Application No. PCT/US2010/021221 dated Aug. 2, 2010.

* cited by examiner

DIRECTORY SEARCH EXAMPLE

A USER WISHING TO SEARCH FOR BOTH INTERNAL NETWORK ENDPOINTS AND EXTERNAL NETWORK ENDPOINTS WILL PERFORM THE FOLLOWING:

402: USING THE LOCAL SCHEDULING USER INTERFACE QUERY THE DIRECTORY SERVICE FOR A LIST OF INTERNAL VIDEO ENDPOINTS.

404: USING THE LOCAL SCHEDULING USER INTERFACE QUERY THE DIRECTORY SERVICE FOR A LIST OF EXTERNAL VIDEO ENDPOINTS.

406: THE DIRECTORY SERVICE WILL FORWARD THIS QUERY TO THE NETWORK ZONE MANAGER. THE NETWORK ZONE MANAGER CONTAINS THE SECURITY POLICIES INCLUDING EXTERNAL ACCESS RIGHTS AND SERVICES PRIVILEGES FOR COMMUNICATION WITH OTHER NETWORK ZONE MANAGERS.

408: BASED ON THE PRECONFIGURED POLICIES THE NETWORK ZONE MANAGER WILL RETURN A LIST OF EXTERNAL VIDEO ENDPOINTS THAT A USER CAN ACCESS.

FIG. 5

SCHEDULING PLANNER REPORT EXAMPLE

A USER WISHING TO SCHEDULE A VIDEO MEETING WITH BOTH INTERNAL NETWORK ENDPOINTS AND EXTERNAL NETWORK ENDPOINTS WILL PERFORM THE FOLLOWING:

502: USING THE LOCAL SCHEDULING USER INTERFACE SPECIFY A DATE/TIME SEARCH RANGE AND QUERY THE RESERVATION SCHEDULING SERVICE FOR A LIST OF INTERNAL VIDEO CALLS.

504: USING THE LOCAL SCHEDULING USER INTERFACE SPECIFY A DATE/TIME SEARCH RANGE AND QUERY THE RESERVATION SCHEDULING SERVICE FOR A LIST OF EXTERNAL VIDEO CALLS.

506: THE RESERVATION SCHEDULING SERVICE WILL FORWARD THIS QUERY TO THE NETWORK ZONE MANAGER. THE NETWORK ZONE MANAGER CONTAINS THE SECURITY POLICIES INCLUDING EXTERNAL ACCESS RIGHTS AND SERVICES PRIVILEGES FOR COMMUNICATION WITH OTHER NETWORK ZONE MANAGERS.

508: BASED ON THE PRECONFIGURED POLICIES THE NETWORK ZONE MANAGER WILL RETURN A LIST OF EXTERNAL VIDEO CALLS THAT A USER CAN VIEW.

510: THE USER NOW VIEWS OR GENERATES A REPORT OF THE LISTED VIDEO CALLS' SCHEDULES.

DISTRIBUTED SCHEDULING, CALL CONTROL, AND RESOURCE MANAGEMENT FOR DISPERSED DYNAMIC VIDEO COMMUNICATIONS NETWORKS

FIELD

The technical field relates to managing conferencing networks and more particularly relates to managing multiple network zones in a video conferencing network.

BACKGROUND

Current video network communication management and scheduling systems manage the network bandwidth, schedule conferences, and control network devices or endpoints involved in conferences. To fulfill this, these systems keep a network model and corresponding conference information in a centralized database. Typical network models have fewer than one thousand managed devices and are relatively stagnant. For ISDN (H.320) video networks this has been the case and therefore the single monolithic management and scheduling system has been a good solution satisfying most of the requirements for network management, conference scheduling and device control. But for IP (SIP, H.323) video networks and mobile 3G (3G-324M) video networks the network is becoming increasingly larger and dynamic. These networks comprise large scale corporate, governmental, educational, or other WANs interconnected for video communication as well as these same organizational networks being externally interconnected with each other. Modeling multiple networks and keeping all conference information in a centralized database is prone to not only decreased performance but increased failure rates, management costs, and data security concerns. The current monolithic system design will only provide a limited and brittle solution for a WAN or Internet video network. In order to support a large scale WAN or inter-enterprise video network and provide some level of QoS (Quality of Service), the current video network communication management and scheduling system needs to be changed to a distributed design and provide more dynamic network management functionalities. This leads to a Distributed Scheduling, Call Control, and Resource Management for Dispersed Dynamic Video Communications Networks system.

SUMMARY

Method, system, and computer program product example embodiments of the invention are disclosed to manage multiple network zones interconnected over a wide area network for video conferencing. The embodiments of the invention provide a standard functional interface for distributed scheduling, call control, and resource management of dispersed dynamic video communications networks. The embodiments of the invention enable each independent system to intercommunicate with one or more other independent systems.

Dispersed dynamic video communications networks are each treated as a network zone. For each network zone, a Network Zone Manager provides scheduling, validation, and control services for requests originating from inside the zone for connections in another zone. The Network Zone Manager also provides real time reporting, monitoring and troubleshooting services about the zone to requesting Network Zone Managers in other zones. The Network Zone Manager maintains service information for multiple zones and provides an inter-zone endpoint look up service. The Network Zone Manager also keeps record of the zone's outbound bandwidth usage.

Each zone includes at least one local network containing video endpoints and gateways and/or gatekeepers, and optionally may include multipoint conferencing units, switches, routers, inverse multiplexers, room control systems, and other communications equipment. Each zone includes a Reservation Scheduling Service, a Network Model Service, a Network Control Service, a Directory Service, and a Notification Service. These services are implemented as computer programs that may be distributed in different computer systems within the zone or alternately, several or all of these services may reside in a single zone controller within the zone. The zone controller may be a multiprocessor architecture or a uniprocessor architecture.

The management of local scheduling, local call control, and local resource management functions performed within a zone by a multiprocessor zone controller may be distributed as a local zone manager function among the Reservation Scheduling Service, Network Model Service, Network Control Service, Directory Service, and Notification Service programs. Alternately, local scheduling, local call control, and local resource management functions performed within a zone by a uniprocessor zone controller may be managed by a separate local zone manager function running as a separate program in the uniprocessor.

The zone controller may invoke the Reservation Scheduling Service running in the zone controller to schedule local network resources in response to video call requests for conferences at the current time or a future time. The zone controller may invoke the Network Model Service running in the zone controller to process all local network resource requests and allocate the local resources based on route and availability. The zone controller may invoke the Network Control Service running in the zone controller to handle all communication to and from local network elements for initiation and termination of video calls within the zone, administrative setup and configuration within the zone, as well as real time network element status within the zone. The zone controller may invoke the Directory Service running in zone controller to maintain a table of video endpoints and associated users within the zone and to provide a lookup service into the table. The zone controller may invoke the Notification Service running in the zone controller to send messages to users within the zone about video call events and to send alarm or trouble ticket messages within the zone for administrative action.

Inter-zone scheduling, call control, and resource management of video conferences is managed by the Network Zone Manager running in the zone controller. The Network Zone Managers exchange scheduling, call control, and resource management messages over the inter-zone management network to manage the dispersed zones in the video communications network. The inter-zone management network may be a wide area network (WAN) or the Internet, for example. The inter-zone management network may be the same wide area network (WAN) or Internet over which video conferencing traffic is exchanged with the zone or it may be a separate network interconnecting the Network Zone Managers.

The Network Zone Manager may invoke the Reservation Scheduling Service in the zone controller to schedule remote network resources in other zones in response to video call requests for conferences at the current time or a future time. The Network Zone Manager may invoke the Network Model Service in the zone controller to process all network resource requests for remote resources in other zones and allocate the remote resources based on route and availability. The Network Zone Manager may invoke the Network Control Service in the zone controller to handle all communication to and from remote network elements in other zones for initiation and termination of video calls including the other zone, administrative setup and configuration in the other zone, as well as real time network element status in the other zone. The Network Zone Manager may invoke the Directory Service in the zone controller to maintain a table of video endpoints and associated users in the other zone and to provide a lookup service into the table. The Network Zone Manager may invoke the Notification Service in the zone controller to send messages to users in the other zone about video call events and to send alarm or trouble ticket messages in the other zone for administrative action.

When a user at a local endpoint within a zone requests the scheduling of local resources for a video conferencing session, the zone controller causes the user query to be directed to the Directory Service serving the zone, for a list of internal video endpoints to present to the user to select which ones to include in the meeting.

When the user requests the scheduling of a video conferencing session that includes resources located in a remote zone, the zone controller causes the user query to be forwarded by the local Directory Service to the Network Zone Manager. The Network Zone Manager contains the security policies including external access rights and services privileges for communication with other Network Zone Managers. Based on the preconfigured policies the local Network Zone Manager will return a list of external or remote video endpoints that a user can include in a video meeting. The user may select which ones to include in the meeting. The user may now save the conference request which initiates a network validation request to the local Network Model Service. The local Network Model Service validates the local network resources required by the local endpoints to participate in the meeting. The local Network Model Service then forwards a network validation request for any external, remote endpoints to the local Network Zone Manager.

The local Network Zone Manager determines which remote Network Zone Managers are responsible for the external, remote endpoints and then will forward the validation request to the remote Network Zone Manager. The remote, responsible Network Zone Manager will request its corresponding remote Network Model Service to validate the remote network resources required by their dependant endpoints for participation in the meeting. The remote responsible Network Zone Manager will receive the remote validation results and return them back to the local, requesting Network Zone Manager.

The local Network Zone Manager will return the external validation results to the local Network Model Service. The network validation information may be segmented across several Network Zone Managers, since each one will be responsible for initiating, terminating, or modifying the video meeting call on its respective network elements.

In addition the local Network Zone Manager acts as a proxy between its internal, local services and other external, remote Network Zone Managers. As a proxy, the local Network Zone Manager handles the security, access privileges, authentication, and denial for access to or from its local services.

In one example embodiment of the invention, an interface of the zone controller is configured to receive a first user request to schedule local resources for a video conferencing session within a local network zone. The zone controller is configured to access local services in the zone to schedule the local resources for the video conferencing session. The interface of the zone controller is further configured to receive a second user request to schedule remote resources in a remote network zone for the video conferencing session. The local Network Zone Manager in the zone controller is configured to determine a remote Network Zone Manager responsible for the remote resources in the remote network zone in response to the second user request. The local Network Zone Manager is further configured to send the second request to the remote Network Zone Manager. The local Network Zone Manager is further configured to receive information on availability of the remote resources from the remote Network Zone Manager and pass the information to the local scheduling service in the zone controller, which is configured to then schedule the video conferencing session between the local and remote resources.

In another example embodiment of the invention, the local Network Zone Manager in the local zone controller is configured to receive from a remote Network Zone Manager in a remote network zone, a request to schedule local resources for a video conferencing session between the local network zone and the remote network zone. The local Network Zone Manager is further configured to access local services in the local network zone, in response to the request. The local Network Zone Manager is further configured to then send to the remote Network Zone Manager information on availability of the local resources, in response to the request.

The resulting embodiments of the invention provide a standard functional interface for distributed scheduling, call control, and resource management of dispersed dynamic video communications networks.

DESCRIPTION OF THE FIGURES

Example embodiments of the invention are shown in the accompanying figures.

DISCUSSION OF EXAMPLE EMBODIMENTS OF THE INVENTION

Figure 1:
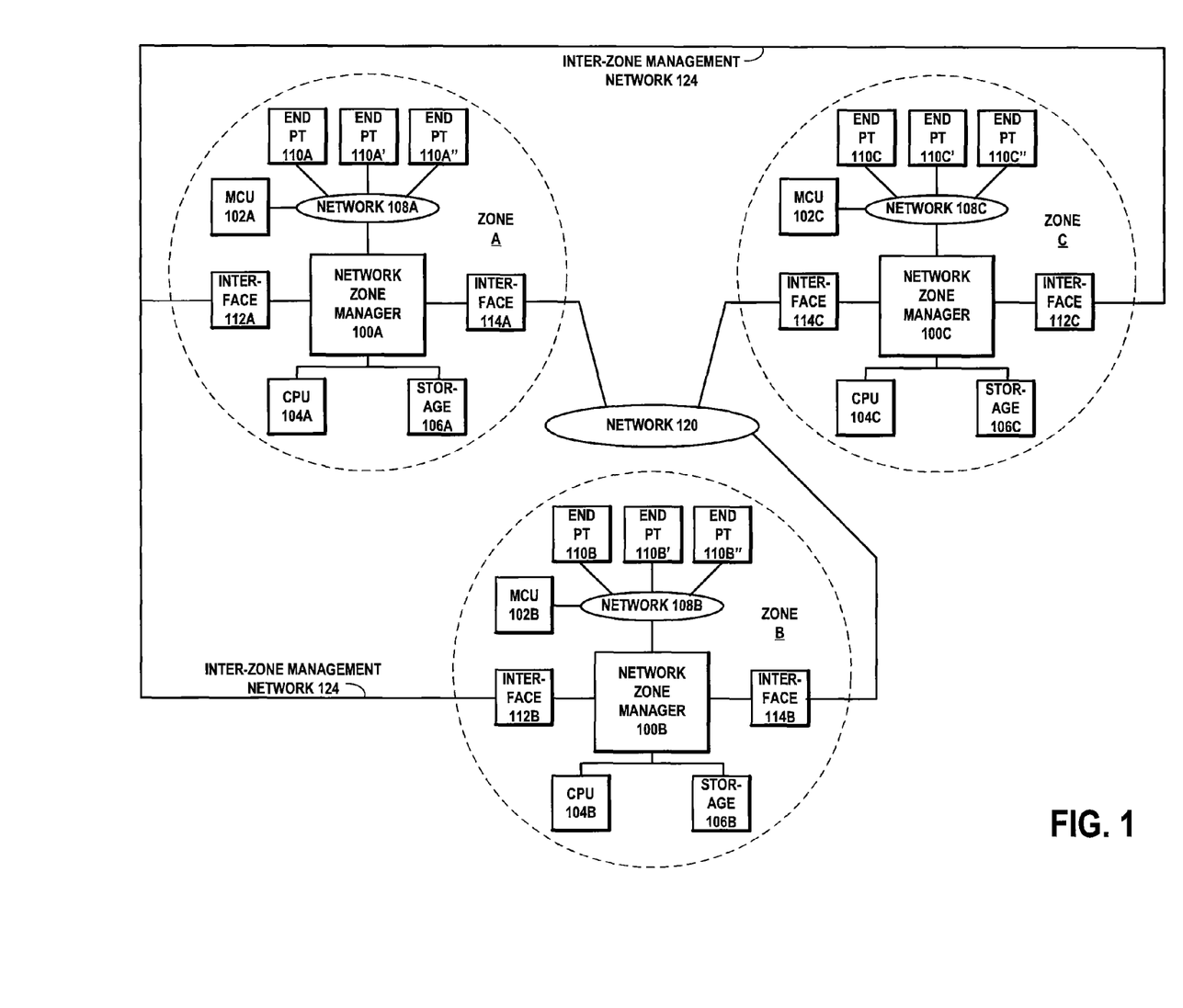
FIG. 1 is an example network diagram showing the multiple network zones, each of which includes a Network Zone Manager connected Network Zone Managers in the other zones over an inter-zone management network.

FIG. 1 is an example network diagram showing a dispersed dynamic video communications network divided into multiple network zones A, B, and C. Each of the network zones A, B, and C includes a Network Zone Manager 100A, 100B, and 100C connected to the other Network Zone Managers 100A, 100B, and 100C in the other zones via an interface 112A, etc. and an inter-zone management network 124. For each network zone, its Network Zone Manager 100 provides scheduling, validation, and control services for requests originating from inside the zone for connections in another zone over the network 124. The Network Zone Manager 100 also provides real time reporting, monitoring and troubleshooting services about the zone to requesting Network Zone Managers in other zones over the network 124. The Network Zone Manager 100 maintains service information for multiple zones and provides an inter-zone endpoint look up service. The Network Zone Manager 100 also keeps record of the zone's outbound bandwidth usage by video conferencing traffic over the network 120, which is a wide area network (WAN) or the Internet, for example. Each of the Network Zone Managers 100A, etc. is part of a zone controller 50A, etc, in its respective zone shown in two example embodiments in FIGS. 2A and 2B.

Each of the network zones A, B, and C includes at least one local network 108A, 108B and 108C containing video endpoints 110A, 110A', 110A", etc. Each of the network zones A, B, and C includes a gateway and/or gatekeeper interface 114A, etc. for video conferencing traffic over the network 120. Each of the network zones A, B, and C optionally may include multipoint conferencing units (MCU) 102A, etc., switches, routers, inverse multiplexers, room control systems, and other communications equipment.

Figure 2A:
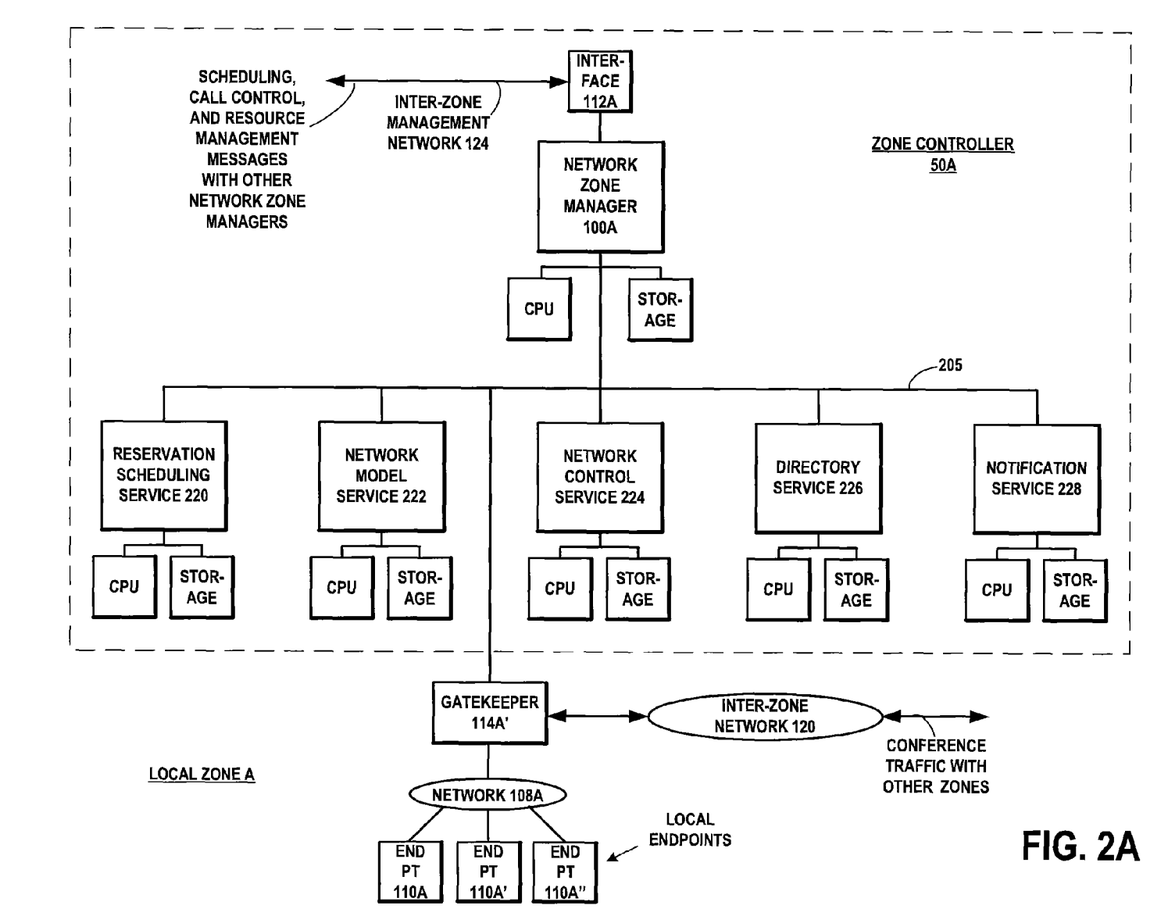
FIG. 2A is an example embodiment of a multiprocessor zone controller and its Network Zone Manager in a zone.

FIG. 2A is an example embodiment of a multiprocessor zone controller 50A and its Network Zone Manager 100A in the network zone A. Each zone includes a Reservation Scheduling Service 220, a Network Model Service 222, a Network Control Service 224, a Directory Service 226, and a Notification Service 228. Call control and resource management functions are handled internally within the zone by the Network Control Service and Network Model Service. These services are implemented as computer programs that may be distributed in different computer systems within the zone A or alternately, several or all of these services may reside on multiple processors in a single zone controller 50A within the zone A. The zone controller 50A shown in FIG. 2A is a multiprocessor architecture, with each service running on a different processor within the zone controller 50A. Some or all of the services may reside on the same processor.

The management of local scheduling, local call control, and local resource management functions performed within a zone A by a multiprocessor zone controller 50A may be distributed as a local zone manager function among the Reservation Scheduling Service 220, a Network Model Service 222, a Network Control Service 224, a Directory Service 226, and a Notification Service 228 programs.

For completely local scheduling within zone A, the zone controller 50A may invoke the Reservation Scheduling Service 220 running in the zone controller to schedule local network resources in response to video call requests for conferences at the current time or a future time. The zone controller 50A may invoke the Network Model Service 222 running in the zone controller to process all local network resource requests and allocate the local resources based on route and availability. The zone controller 50A may invoke the Network Control Service 224 running in the zone controller to handle all communication to and from local network elements for initiation and termination of video calls within the zone, administrative setup and configuration within the zone, as well as real time network element status within the zone. The zone controller 50A may invoke the Directory Service 226 running in zone controller to maintain a table of video endpoints and associated users within the zone and to provide a lookup service into the table. The zone controller 50A may invoke the Notification Service 228 running in the zone controller to send messages to users within the zone about video call events and to send alarm or trouble ticket messages within the zone for administrative action.

For inter-zone scheduling between zone A and other zones B or C, call control, and resource management of video conferences is managed by the Network Zone Manager 100A running in the zone controller 50A. The Network Zone Managers exchange scheduling, call control, and resource management messages over inter-zone management network 124 to manage the dispersed zones in the video communications network. The inter-zone management network 124 may be a wide area network (WAN) or the Internet, for example. The inter-zone management network 124 may be the same wide area network (WAN) or Internet 120 over which video conferencing traffic is exchanged with the zone A or it may be a separate network interconnecting the Network Zone Managers.

The Network Zone Manager 100A may invoke the Reservation Scheduling Service 220 in the zone controller 50A to schedule remote network resources in other zones in response to video call requests for conferences at the current time or a future time. The Network Zone Manager 100A may invoke the Network Model Service 222 in the zone controller 50A to process all network resource requests for remote resources in other zones and allocate the remote resources based on route and availability. The Network Zone Manager 100A may invoke the Network Control Service 224 in the zone controller 50A to handle all communication to and from remote network elements in other zones for initiation and termination of video calls including the other zone, administrative setup and configuration in the other zone, as well as real time network element status in the other zone. The Network Zone Manager 100A may invoke the Directory Service 226 in the zone controller 50A to maintain a table of video endpoints and associated users in the other zone and to provide a lookup service into the table. The Network Zone Manager 100A may invoke the Notification Service 228 in the zone controller 50A to send messages to users in the other zone about video call events and to send alarm or trouble ticket messages in the other zone for administrative action.

When a user at a local endpoint 110A, for example, within the zone A requests the scheduling of local resources for a video conferencing session, the zone controller 50A causes the user query to be directed to the Directory Service 226 serving the zone A, for a list of internal video endpoints 110A, 110B, and 110C to present to the user to select which ones to include in the meeting.

When the user requests the scheduling of a video conferencing session that includes resources located in a remote zone B or C, the zone controller 50A causes the user query to be forwarded by the local Directory Service 226 to the Network Zone Manager 100A. The Network Zone Manager 100A contains the security policies including external access rights and services privileges for communication with other Network Zone Managers B and C. Based on the preconfigured policies the local Network Zone Manager 100A will return a list of external or remote video endpoints that a user can include in a video meeting. The user may select which ones to include in the meeting. The user may now save the conference request which causes the zone controller 50A to initiate a network validation request to the local Network Model Service 222. The local Network Model Service 222 validates the local network resources required by the local endpoints to participate in the meeting. The local Network Model Service 222 then forwards a network validation request for any external, remote endpoints to the local Network Zone Manager 100A.

The local Network Zone Manager 100A determines which remote Network Zone Managers 100B or 100C are responsible for the external, remote endpoints and then will forward the validation request over the network 124 to the remote Network Zone Manager, for example 100B. The remote, responsible Network Zone Manager 10B will request its corresponding remote Network Model Service 222 to validate the remote network resources required by their dependant, remote endpoints for participation in the meeting. The remote responsible Network Zone Manager 100B will receive the remote validation results and return them back to the local, requesting Network Zone Manager 100A over the network 124.

The local Network Zone Manager 100A will return the external validation results to the local Network Model Service 222. The network validation information may be segmented across several Network Zone Managers 100A and 100B, since each one will be responsible for initiating, terminating, or modifying the video meeting call on its respective network elements.

In addition the local Network Zone Manager 100A acts as a proxy between its internal, local services and other external, remote Network Zone Managers 100B and 100C. As a proxy, the local Network Zone Manager 100A handles the security, access privileges, authentication, and denial for access to or from its local services.

Figure 2B:
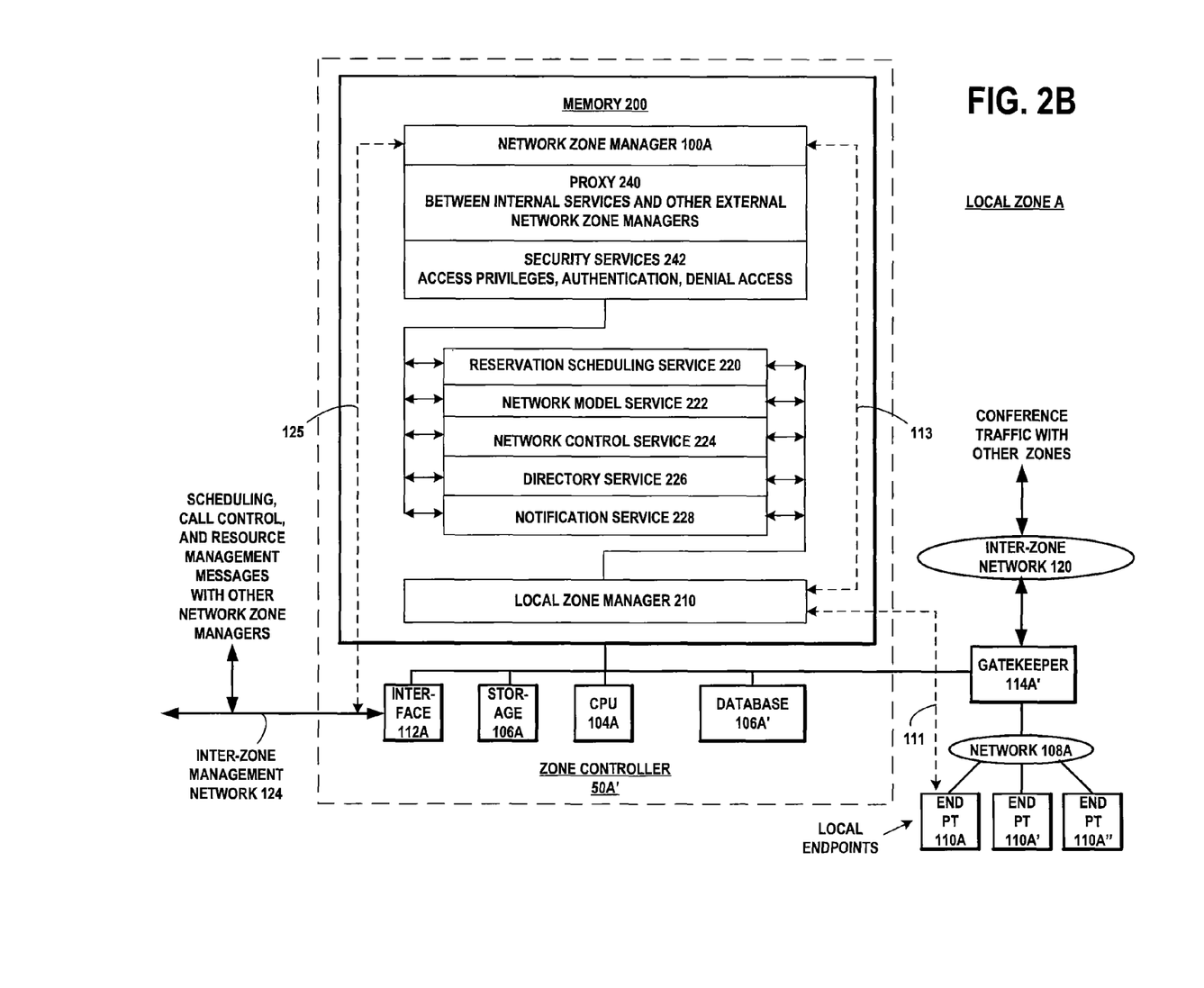
FIG. 2B is an example embodiment of a uniprocessor zone controller and its Network Zone Manager in a zone.

FIG. 2B is an example embodiment of a uniprocessor zone controller 50A' and its Network Zone Manager 100A in zone A. Local scheduling, local call control, and local resource management functions performed within the zone A by the uniprocessor zone controller 50A', which may include a separate local zone manager function 210 running as a separate program in the uniprocessor. The Network Zone Manager 100A runs in the memory 200 of the zone controller 50A'. Network Zone Manager 100A acts as a proxy 240 between its internal, local services and other external, remote Network Zone Managers. As a proxy, the local Network Zone Manager 100A handles the security services 242, including security, access privileges, authentication, and denial for access to or from its local services.

The local zone manager function 210 may invoke the Reservation Scheduling Service 220 running in the memory 200 of the zone controller 50A' to schedule local network resources in response to video call requests for conferences at the current time or a future time. The local zone manager function 210 may invoke the Network Model Service 222 running in the memory 200 of the zone controller 50A' to process all local network resource requests and allocate the local resources based on route and availability. The local zone manager function 210 may invoke the Network Control Service 224 running in the memory 200 of the zone controller 50A' to handle all communication to and from local network elements for initiation and termination of video calls within the zone, administrative setup and configuration within the zone, as well as real time network element status within the zone. The local zone manager function 210 may invoke the Directory Service 226 running in memory 200 of the zone controller 50A' to maintain a table of video endpoints and associated users within the zone and to provide a lookup service into the table. The local zone manager function 210 may invoke the Notification Service 228 running in the memory 200 of the zone controller 50A' to send messages to users within the zone about video call events and to send alarm or trouble ticket messages within the zone for administrative action.

When a user at a local endpoint 110A, for example, within the zone A requests the scheduling of local resources for a video conferencing session, the local zone manager function 210 in zone controller 50A' causes the user query to be directed to the Directory Service 226 serving the zone A over path 111, for a list of internal video endpoints 110A, 110B, and 110C to present to the user to select which ones to include in the meeting.

When the user requests the scheduling of a video conferencing session that includes resources located in a remote zone B or C, the local zone manager function 210 in zone controller 50A' causes the user query to be forwarded over path 113 to the Network Zone Manager 100A. The Network Zone Manager 100A then requests information from the other Network Zone Managers 100B and C for any external, remote endpoints, as previously discussed. The local Network Zone Manager 100A will return the external validation results to the local Network Model Service 222 over path 125.

Figure 3:
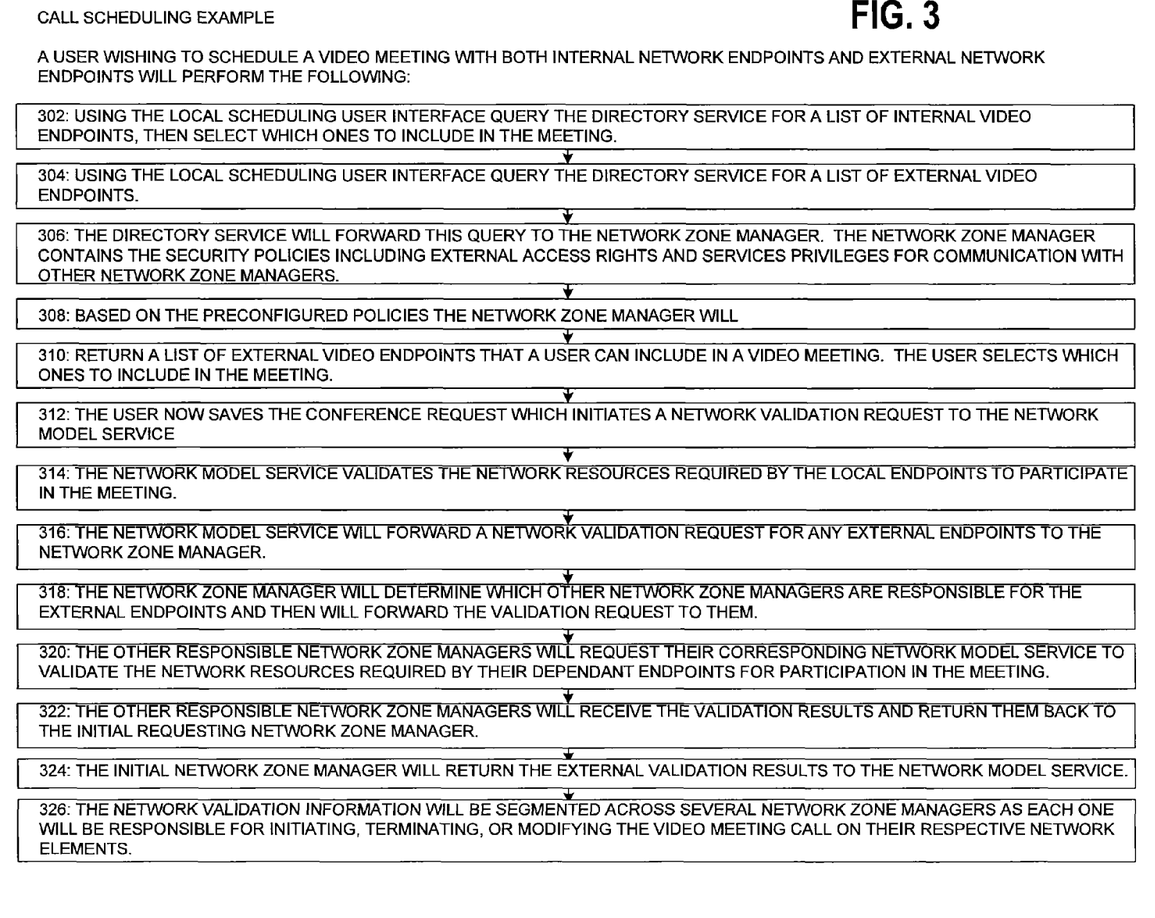
FIG. 3 is an example flow diagram of the operation of the zone controller and its Network Zone Manager for a call scheduling example.

FIG. 3 is an example flow diagram of the operation of the zone controller and its Network Zone Manager for a call scheduling example. In this example, a user wishing to schedule a video meeting with both internal network endpoints and external network endpoints will perform the following steps:

Step 302: using the local scheduling user interface query the directory service for a list of internal video endpoints, then select which ones to include in the meeting.

Step 304: using the local scheduling user interface query the directory service for a list of external video endpoints.

Step 306: the directory service will forward this query to the network zone manager. the network zone manager contains the security policies including external access rights and services privileges for communication with other network zone managers.

Step 308: based on the preconfigured policies the network zone manager will Step 310: return a list of external video endpoints that a user can include in a video meeting. the user selects which ones to include in the meeting.

Step 312: the user now saves the conference request which initiates a network validation request to the network model service Step 314: the network model service validates the network resources required by the local endpoints to participate in the meeting.

Step 316: the network model service will forward a network validation request for any external endpoints to the network zone manager.

Step 318: the network zone manager will determine which other network zone managers are responsible for the external endpoints and then will forward the validation request to them.

Step 320: the other responsible network zone managers will request their corresponding network model service to validate the network resources required by their dependant endpoints for participation in the meeting.

Step 322: the other responsible network zone managers will receive the validation results and return them back to the initial requesting network zone manager.

Step 324: the initial network zone manager will return the external validation results to the network model service.

Step 326: the network validation information will be segmented across several network zone managers as each one will be responsible for initiating, terminating, or modifying the video meeting call on their respective network elements.

Figure 4:
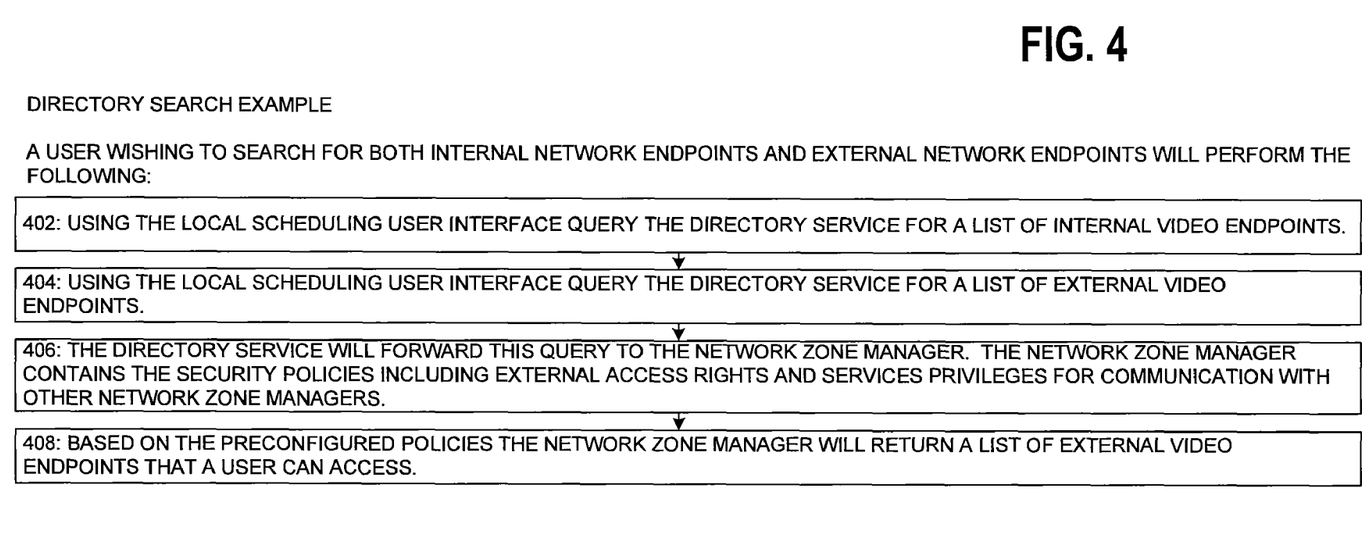
FIG. 4 is an example flow diagram of the operation of the zone controller and its Network Zone Manager for a directory search example.

FIG. 4 is an example flow diagram of the operation of the zone controller and its Network Zone Manager for a directory search example. In this example, a user wishing to search for both internal network endpoints and external network endpoints will perform the following steps:

Step 402: using the local scheduling user interface query the directory service for a list of internal video endpoints.

Step 404: using the local scheduling user interface query the directory service for a list of external video endpoints.

Step 406: the directory service will forward this query to the network zone manager. the network zone manager contains the security policies including external access rights and services privileges for communication with other network zone managers.

Step 408: based on the preconfigured policies the network zone manager will return a list of external video endpoints that a user can access.

Figure 5:
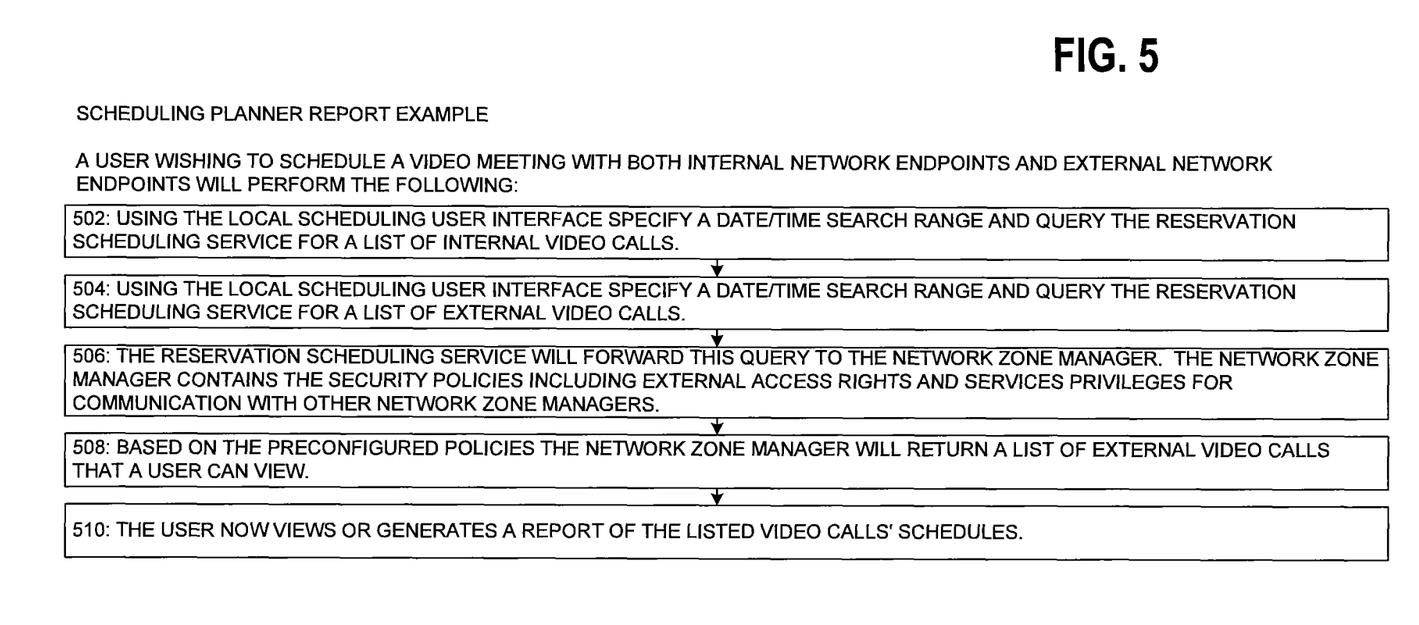
FIG. 5 is an example flow diagram of the operation of the zone controller and its Network Zone Manager for a scheduling planner report example.

FIG. 5 is an example flow diagram of the operation of the zone controller and its Network Zone Manager for a scheduling planner report example. In this example, a user wishing to schedule a video meeting with both internal network endpoints and external network endpoints will perform the following steps:

Step 502: using the local scheduling user interface specify a date/time search range and query the reservation scheduling service for a list of internal video calls.

Step 504: using the local scheduling user interface specify a date/time search range and query the reservation scheduling service for a list of external video calls.

Step 506: the reservation scheduling service will forward this query to the network zone manager. the network zone manager contains the security policies including external access rights and services privileges for communication with other network zone managers.

Step 508: based on the preconfigured policies the network zone manager will return a list of external video calls that a user can view.

Step 510: the user now views or generates a report of the listed video calls' schedules.

Figure 6:
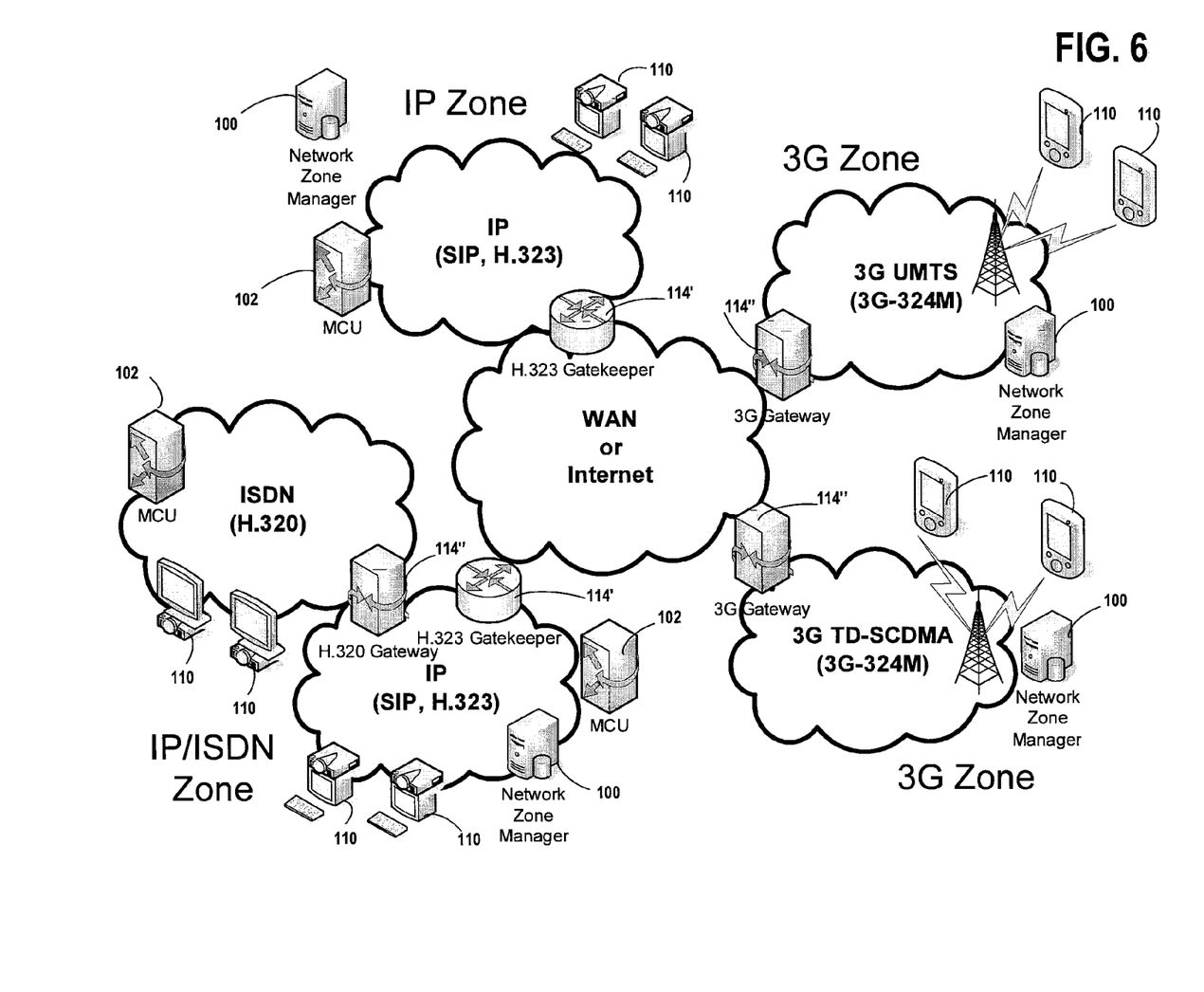
FIG. 6 is an example network diagram showing the multiple network zones, each of which includes a Network Zone Manager connected to Network Zone Managers in the other zones over a wide area network (WAN) or the Internet.

FIG. 6 is an example network diagram showing the multiple network zones, each of which includes a Network Zone Manager 100 connected to Network Zone Managers 100 in the other zones over a wide area network (WAN) or the Internet. For each network zone, its Network Zone Manager 100 provides scheduling, validation, and control services for requests for connections between its zone and another zone.

The system includes multiple Network Zone Managers that schedule, control, and manage multiple video networks. These networks include ISDN (H.320) video network elements, IP (SIP, H.323) video network elements, and mobile 3G (3G-324M) video network elements. A Network Zone Manager is comprised of a Reservation Scheduling Service, a Network Model Service, a Network Control Service, a Directory Service, and a Notification Service. The Reservation Scheduling Service allows users, other Network Zone Managers, or external systems to submit video call requests for network resources for the current time or any future time. The Network Model Service processes all network resource requests and allocates the resources based on route and availability. The Network Control Service handles all communication to and from network elements for initiation and termination of video calls, administrative setup and configuration, as well as real time network element status. The Directory Service maintains a database of video endpoints and associated users that it provides as a lookup service to users and other Network Zone Managers. The Notification Service sends messages to users about video call events and the service sends alarm or trouble ticket messages for administrative action.

The networks comprise H.320 circuit switched video network elements, 3G-324M circuit switched video network elements, SIP packet switched video network elements, and H.323 packet switched video network elements. The network elements are endpoints, multipoint conferencing units, gateways, gatekeepers, switches, routers, inverse multiplexers, and room control systems. The associated video network elements further comprise at least two or more H.320, H.323, 3G-324M, and SIP compliant video networks.

Each Network Zone Manager is operable to combine the Reservation Scheduling Service, the Network Model Service, the Network Control Service, the Directory Service, and the Notification Service for the associated network elements in the assigned network zone. Each Network Zone Manager is operable to intercommunicate with at least one or more other Network Zone Managers assigned to different network zones. Each Network Zone Manager is operable to request network resources from other Network Zone Managers to create an inter-zone or inter-network video call. Each Network Zone Manager is operable to provide network resources to connect video call requests originating from one or more other Network Zone Managers. Each Network Zone Manager is operable to deny network resources for connecting video call requests originating from one or more other Network Zone Managers. Each Network Zone Manager is operable to manage and schedule outbound bandwidth resources. Each Network Zone Manager is operable to manage and schedule inbound bandwidth resources. Each Network Zone Manager is operable to share endpoint call directory information with at least one or more other Network Zone Managers assigned to different network zones. Each Network Zone Manager is operable to track, monitor, and report all zone or network resource usage by one or more other Network Zone Managers. A database listing is provided of all externally requested network resources originating in, terminating in, or traversing through the local Network Zone Manger network.

A security database is operable to have Network Zone Manager network security policies including external access rights and services privileges for one or more other Network Zone Managers. The security database operable to have Network Zone Manager directory security policies including external access rights and services privileges for one or more other Network Zone Managers.

Security concerns regarding the sharing of information (e.g. scheduling data, room availability, device compatibility, dialing directory, etc.) are handled by and managed through the Network Zone Manager Security Policies engine.

By default the security policies will be the most restrictive (i.e. no external access allowed.) The follow security policies may be enabled and managed by an authorized system administrator.

1. Which extra-nets are allowed access to the local network.
2. Which extra-nets are accessible from the local network.
3. Which internal resources are accessible for external requests.
4. Which external resources are accessible for internal requests.
5. Which internal users are allowed to request external resources.
6. Which external users are allowed to request internal resources.
7. What internal reservation types are allowed for external requests.

8. What external reservation types are allowed for internal requests.

9. What internal interaction level is granted to external users (e.g. view-only, view and validate, or administration.)

10. What external interaction level is granted to internal users (e.g. view-only, view and validate, or administration.)

11. What level of internal data details is granted to external users (e.g. sanitized, summarized, or fully detailed.)

12. What level of external data details is granted to internal users (e.g. sanitized, summarized, or fully detailed.)

Figure 7:
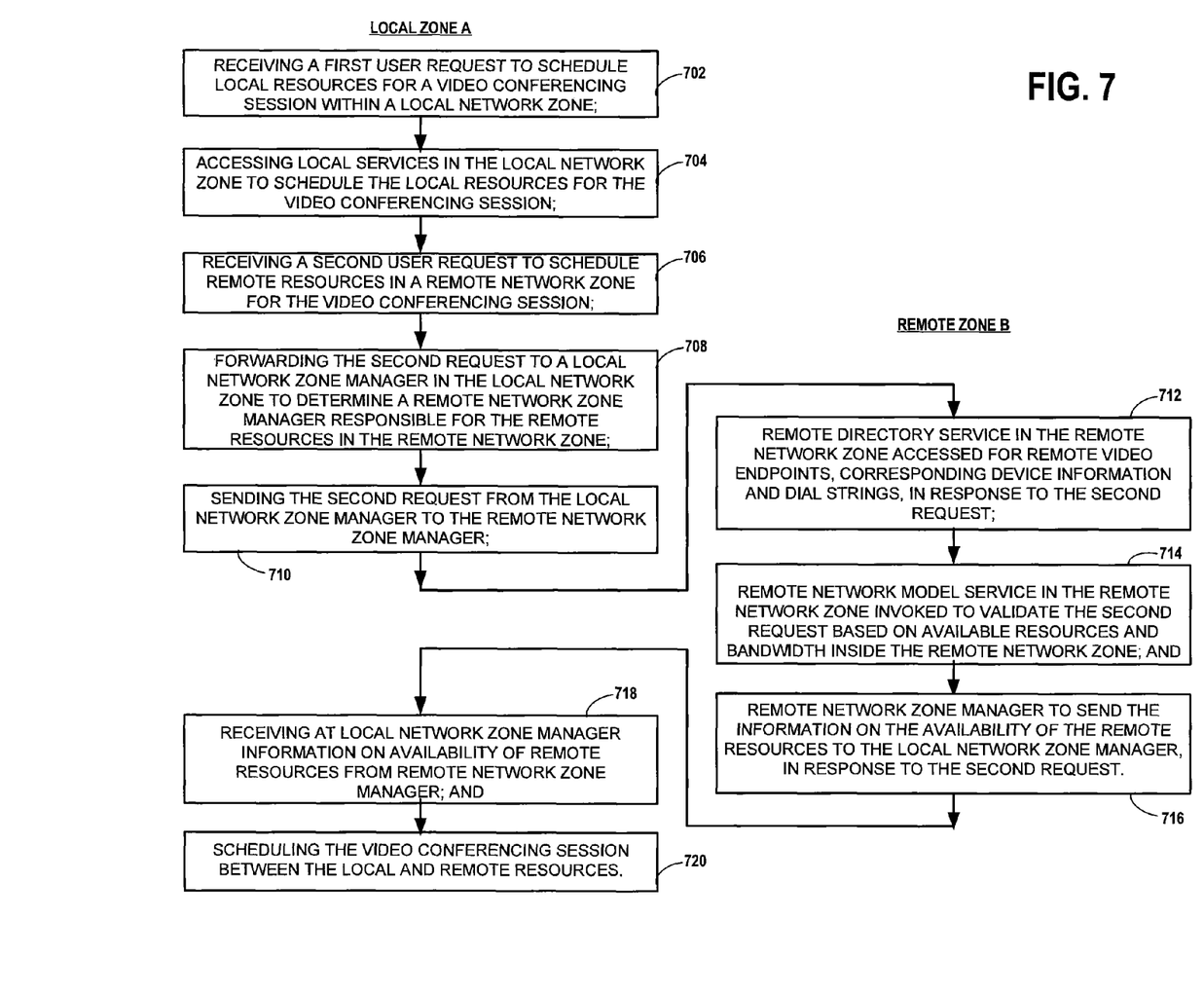
FIG. 7 is an example flow diagram illustrating the interaction of the zone controllers and their respective Network Zone Managers in two zones in a scheduling operation.

FIG. 7 is an example flow diagram illustrating the interaction of the zone controllers and their respective Network Zone Managers in two zones A and B, in a scheduling operation.

Steps in Local Zone A:

Local Zone A, step 702: Receiving a first user request to schedule local resources for a video conferencing session within a local network zone;

Local Zone A, step 704: Accessing local services in the local network zone to schedule the local resources for the video conferencing session;

Local Zone A, step 706: Receiving a second user request to schedule remote resources in a remote network zone for the video conferencing session;

Local Zone A, step 708: Forwarding the second request to a local network zone manager in the local network zone to determine a remote network zone manager responsible for the remote resources in the remote network zone;

Local Zone A, step 710: Sending the second request from the local network zone manager to the remote network zone manager;

Steps in Remote Zone B:

Remote Zone B, step 712: Remote directory service in the remote network Zone Accessed for remote video endpoints, corresponding device information and dial strings, in response to the second request;

Remote Zone B, step 714: Remote network model service in the remote network zone invoked to validate the second request based on available resources and bandwidth inside the remote network zone; and Remote Zone B, step 716: Remote network zone manager to send the information on the availability of the remote resources to the local network zone manager, in response to the second request.

Steps in Local Zone A:

Local Zone A, step 718: Receiving at local network zone manager information on availability of remote resources from remote network zone manager; and Local Zone A, step 720: Scheduling the video conferencing session between the local and remote resources.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

The resulting embodiments of the invention provide a standard functional interface for distributed scheduling, call control, and resource management of dispersed dynamic video communications networks.

Although example embodiments of the invention have been disclosed, a person skilled in the art will understand that changes can be made to the example embodiments without departing from the spirit and scope of the invention.

What is claimed is:

1. A method, comprising:

receiving a first user request to schedule local resources for a video conferencing session within a local network zone;

accessing local services in the local network zone to schedule the local resources for the video conferencing session;

receiving a second user request to schedule remote resources in a remote network zone for the video conferencing session;

forwarding the second request to a local Network Zone Manager in the local network zone to determine a remote Network Zone Manager responsible for the remote resources in the remote network zone;

sending the second request from the local Network Zone Manager to the remote Network Zone Manager;

receiving at the local Network Zone Manager information on the availability of the remote resources from the remote Network Zone Manager; and scheduling the video conferencing session between the local and remote resources;

wherein said sending the second request to the remote Network Zone Manager further comprises:

causing a remote directory service in the remote network zone to be accessed for remote video endpoints, corresponding device information and dial strings, in response to the second request;

causing a remote network model service in the remote network zone to be invoked to validate the second request based on available resources and bandwidth inside the remote network zone; and causing the remote Network Zone Manager to send the information on the availability of the remote resources to the local Network Zone Manager, in response to the second request.

2. The method of claim 1, wherein said accessing local services further comprises:

accessing a local directory service for local video endpoints, corresponding device information and dial strings;

invoking a local network model service to validate the first request based on available resources and bandwidth inside the local network zone; and invoking a local reservation scheduling service to create a video call schedule that includes local endpoints and local network resources.

3. The method of claim 1, wherein said local services further comprise:

one or more services selected from the group consisting of reservation scheduling service, network model service, network control service, directory service, and notification service.

4. The method of claim 1, wherein said forwarding the second request to a local Network Zone Manager further comprises:
applying security policies by the local Network Zone Manager for access rights and services privileges of the remote Network Zone Manager, and
managing bandwidth resources by the local Network Zone Manager.

5. A computer program product, comprising:
a non-transitory computer readable medium containing computer executable program code;
computer executable program code in said medium for receiving a first user request to schedule local resources for a video conferencing session within a local network zone;
computer executable program code in said medium for accessing local services in the local network zone to schedule the local resources for the video conferencing session;
computer executable program code in said medium for receiving a second user request to schedule remote resources in a remote network zone for the video conferencing session;
computer executable program code in said medium for forwarding the second request to a local Network Zone Manager in the local network zone to determine a remote Network Zone Manager responsible for the remote resources in the remote network zone;
computer executable program code in said medium for sending the second request from the local Network Zone Manager to the remote Network Zone Manager;
computer executable program code in said medium for receiving at the local Network Zone Manager information on the availability of the remote resources from the remote Network Zone Manager; and
computer executable program code in said medium for scheduling the video conferencing session between the local and remote resources;
wherein said sending the second request to the remote Network Zone Manager further comprises:
computer executable program code in said medium for causing a remote directory service in the remote network zone to be accessed for remote video endpoints, corresponding device information and dial strings, in response to the second request;
computer executable program code in said medium for causing a remote network model service in the remote network zone to be invoked to validate the second request based on available resources and bandwidth inside the remote network zone; and
computer executable program code in said medium for causing the remote Network Zone Manager to send the information on the availability of the remote resources to the local Network Zone Manager, in response to the second request.

6. The non-transitory computer readable medium of claim 5, wherein said accessing local services further comprises:
computer executable program code in said medium for accessing a local directory service for local video endpoints, corresponding device information and dial strings;
computer executable program code in said medium for invoking a local network model service to validate the first request based on available resources and bandwidth inside the local network zone; and
computer executable program code in said medium for invoking a local reservation scheduling service to create a video call schedule that includes local endpoints and local network resources.

7. The non-transitory computer readable medium of claim 5, wherein said local services further comprise:
one or more services selected from the group consisting of reservation scheduling service, network model service, network control service, directory service, and notification service.

8. The non-transitory computer readable medium of claim 5, wherein said forwarding the second request to a local Network Zone Manager further comprises:
computer executable program code in said medium for applying security policies by the local Network Zone Manager for access rights and services privileges of the remote Network Zone Manager, and
computer executable program code in said medium for managing bandwidth resources by the local Network Zone Manager.

9. An apparatus, comprising:
an interface configured to receive a first user request to schedule local resources for a video conferencing session within a local network zone;
a controller configured to access local services in the local network zone to schedule the local resources for the video conferencing session;
said interface configured to receive a second user request to schedule remote resources in a remote network zone for the video conferencing session;
a local Network Zone Manager in the local network zone configured to determine a remote Network Zone Manager responsible for the remote resources in the remote network zone in response to the second user request;
said local Network Zone Manager configured to send the second request to the remote Network Zone Manager;
said local Network Zone Manager configured to receive at the local Network Zone Manager information on availability of the remote resources from the remote Network Zone Manager; and
a local scheduling service configured to schedule the video conferencing session between the local and remote resources
wherein said sending the second request to the remote Network Zone Manager further comprises:
cause a remote directory service in the remote network zone to be accessed for remote video endpoints, corresponding device information and dial strings, in response to the second request;
cause a remote network model service in the remote network zone to be invoked to validate the second request based on available resources and bandwidth inside the remote network zone; and
cause the remote Network Zone Manager to send the information on the availability of the remote resources to the local Network Zone Manager, in response to the second request.

10. The apparatus of claim 9, further comprising:
said controller configured to access a local directory service for information on local video endpoints, corresponding device information and dial strings;

a local network model service configured to validate the first request based on available resources and bandwidth inside the local network zone; and said local scheduling service configured to create a video call schedule that includes local endpoints and local network resources.

11. The apparatus of claim 9, wherein said local services further comprise:

one or more services selected from the group consisting of reservation scheduling service, network model service, network control service, directory service, and notification service.

12. The apparatus of claim 9, further comprising:

said local Network Zone Manager configured to apply security policies for access rights and services privileges of the remote Network Zone Manager and manage bandwidth resources.

13. The apparatus of claim 9, wherein said network zones comprise equipment selected from the group consisting of H.320 circuit switched video network elements, 3G-324M circuit switched video network elements, SIP packet switched video network elements, and H.323 packet switched video network elements.

14. The apparatus of claim 9, wherein said network zones comprise equipment selected from the group consisting of endpoints, multipoint conferencing units, gateways, gatekeepers, switches, routers, inverse multiplexers, and room control systems.

15. The apparatus of claim 9, wherein said local Network Zone Manager is configured to deny network resources for connecting video call requests originating from the remote Network Zone Manager.

16. The apparatus of claim 9, wherein said local Network Zone Manager is configured to manage and schedule outbound bandwidth resources.

17. The apparatus of claim 9, wherein said local Network Zone Manager is configured to manage and schedule inbound bandwidth resources.

18. The apparatus of claim 9, wherein said local Network Zone Manager is configured to share endpoint call directory information with at least one or more other Network Zone Managers assigned to different network zones.

19. The apparatus of claim 9, wherein said local Network Zone Manager is configured to track, monitor, and report all zone or network resource usage by one or more other Network Zone Managers.

20. The apparatus of claim 9, further comprising:

a local database in the local network zone configured to list all externally requested network resources originating in, terminating in, or traversing through the local network zone.

21. The apparatus of claim 9, further comprising:

a security database in the local network zone configured to store security policies, including external access rights and services privileges for one or more other Network Zone Managers.

* * * * *